United States Patent [19]

Källström

[11] Patent Number: 4,636,670

[45] Date of Patent: Jan. 13, 1987

[54] CONTROL GEAR FOR A DYNAMO CONNECTED TO A HUB

[75] Inventor: Olof Källström, Mölnlycke, Sweden

[73] Assignee: Ingvar Nilsson Mekaniska AB, Mölnlycke, Sweden

[21] Appl. No.: 694,456

[22] PCT Filed: May 4, 1984

[86] PCT No.: PCT/SE84/00168

§ 371 Date: Jan. 2, 1985

§ 102(e) Date: Jan. 2, 1985

[87] PCT Pub. No.: WO84/04285

PCT Pub. Date: Nov. 8, 1984

[30] Foreign Application Priority Data

May 4, 1983 [SE] Sweden ............................. 8302545

[51] Int. Cl.$^4$ .................... B69J 5/12; H02K 7/112
[52] U.S. Cl. .................. 310/67 A; 188/70 R; 188/74; 310/71; 310/75 B; 310/77
[58] Field of Search ............... 310/67 A, 68 R, 68 A, 310/75 R, 100, 115, 71, 27, 93, 75 B, 77; 322/12, 1; 362/192, 193; 188/70 R, 74

[56] References Cited

FOREIGN PATENT DOCUMENTS

| 40443 | 9/1968 | Finland. | |
|---|---|---|---|
| 872498 | 6/1942 | France | 310/67 A |
| 107985 | 12/1924 | Switzerland | 310/67 A |
| 265700 | 12/1949 | Switzerland | 310/67 A |
| 527726 | 10/1940 | United Kingdom | 310/67 A |
| 756705 | 9/1956 | United Kingdom | 310/67 A |

Primary Examiner—Patrick R. Salce
Assistant Examiner—D. L. Rebsch
Attorney, Agent, or Firm—Cushman, Darby & Cushman

[57] ABSTRACT

A hub and dynamo arrangement includes a wheel hub rotatable about the axis of a fixed shaft; a dynamo having an annular stator carried by the hub, an annular armature disposed radially inwardly of the stator and a current collector fixed to the armature for leading off current generated by the dynamo, the armature being mounted for rotation about the axis of the shaft independently of the hub; a control device for selectively arresting and permitting rotation of the armature about the axis of the shaft, whereby electric current is generated when the armature is arrested, the control device including a contact member mounted for radial movement relative to the axis of the shaft and mounted in a position such that the radial movement effects current-transmitting and rotation-locking engagement with the current collector; and an electrically-conducting, actuating wire attached to the contact member, both for transmitting current from the contact member, and for applying mechanical actuating force to the contact member.

5 Claims, 3 Drawing Figures

U.S. Patent  Jan. 13, 1987  4,636,670
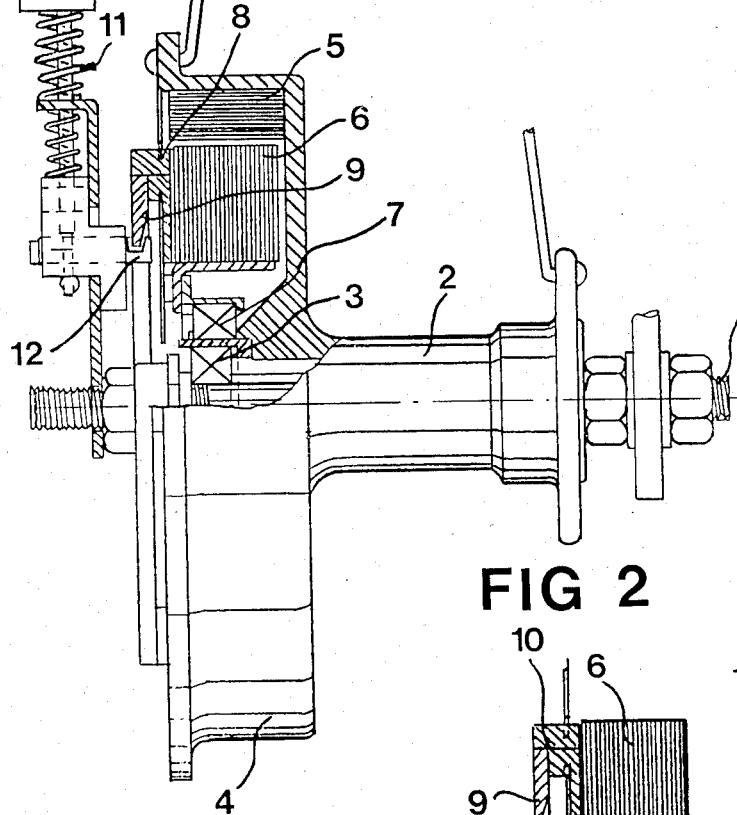

CONTROL GEAR FOR A DYNAMO CONNECTED TO A HUB

BACKGROUND OF THE INVENTION

The present invention refers to a control gear for a dynamo connected to a hub, particularly a wheel hub and which dynamo is of the type which incorporates a stator and a armature rotatable with the hub, and being arranged radially relative to each other and where the stator or armature can be prevented from rotation by means of a locking device, and where a current collector is arranged to lead off current generated during arresting of stator or armature.

Such a hub-connected dynamo is a suitable design for the current supply of the lighting of a bicycle, even if its use is not limited thereto.

Dynamos of this type, which are used for generation of current for bicycle lighting have been on the market in a plurality of different embodiments and they entail advantages such as reliability, high efficiency, slight influences from weather conditions and the state of the roads, no tire wear and easier prevention of thefts than most conventional arrangements.

In Finnish patent specification No. 40443 is described such a bicycle dynamo incorporating an annular stator body with a stator winding, which is connected to the hub of the bicycle wheel and always participates in the rotation of the bicycle wheel, and a rotatably supported rotor, arranged inside the stator body and arrestable against rotation by means of a control latch, which extends through a covering plate and can be make to assume a current generating position in which the rotor is thus prevented from rotation and which is free to rotate in the second, current free position. Current collectors are arranged in the covering lid.

The problem of this design is that it is rather difficult to operate the dynamo and particularly to disconnect it, which means that the dynamo can cause accidents if during bicycling the bicycle lights need to be turned ON or OFF, as it is thereby necessary to kick with a foot against the control latch which projects from the hub.

THE PURPOSE AND MOST ESSENTIAL FEATURES OF THE INVENTION

The purpose of the present invention is to provide a control gear for a dynamo connected to a hub, particularly a wheel hub and of a type described above, which gear retains the above stated advantages and at the same time has a simpler and more reliable operation.

DESCRIPTION OF THE DRAWINGS

The invention will hereinafter be further described with reference to an embodiment shown in the accompanying drawing.

FIG. 1 shows in a partly sectional view a hub generator having a control gear according to the invention.

FIG. 2 is a corresponding view of a portion of the armature of the generator, and FIG. 3 shows a part of the control gear.

DESCRIPTION OF THE EMBODIMENT

FIG. 1 shows in a partly sectional view a bicycle hub 2 arranged on a wheel shaft 1, and which is supported on the shaft in two rolling bearings, preferably deep groove ball bearings, one of which is shown at 3, whereas the other is situated at the opposite axial end of the hub. The bicycle hub 2 is thus designed as a bearing housing, but it furthermore has a portion 4 arranged at one of the axial ends which has a bigger diameter. This portion acts as a generator housing and carries on its internal envelope surface magnets 5 in annular form, which constitute a dynamo stator, which rotates with the hub. The armature 6 of the dynamo is arranged radially outside the hub bearing 3 shown in the figure and it is rotatably supported in a rolling bearing 7, preferably a deep groove ball bearing, whereby the armature likewise can take part in the rotational movement of the hub, without thereby causing any appreciable braking effect as the armature is well supported.

The armature 6 is connected to a shaped current collector 8 in form of a ring fixed to one end surface of the armature and having a radially directed outer flange 9.

In FIG. 2 is separately shown armature 6 and current collector 8, and as can be seen herefrom, the current generated is transferred to the current collector via a wire 10. Due to the particular design of the current collector with its outer radial flange 9 a space situated inside the current collector is created in which space a contact pin 12 connected to a control device 11 is intended to engage. The current is then led from the contact pin via a conductor which also acts as a connecting wire 13 to the current load 14.

FIG. 3 shows the control device 11, which incorporates a connecting arm 15 by means of which the device is fitted to the wheel shaft (see FIG. 1). The connecting arm is provided with an opening 16 in which a slider 17 is movably arranged. The slider 17 is connected to the connecting wire 13 which also acts as a current conductor, and the slider carries also contact pin 12, which is arranged to extend from the slider perpendicularly to its track of movement in the opening 16 of the connecting arm. The connecting wire 13 is biased by means of a spring arrangement 18 against a position where the contact pin 12 is at some distance from engagement with the flange 9 of the current collector.

By means of a simple, not shown operating member, which is preferably arranged on the bicycle handlebar, it is possible to stretch the connecting wire 13, whereby the contact pin 12 will be moved against the action of the springs 18, to engagement with the current collector flange 9, whereby at the same time the armature 6 will be arrested, so that it does not rotate with the magnets 5. The dynamo will then generate current, which via the current collector 8, the contact pin 12 and the connecting wire 13 is transferred to the bicycle lamp 14 or to any other suitable current load. When the operating device on the handlebar is switched to the off-position, the connecting wire 13 will be slackened, and by means of the springs 18 the slider 17 will again be moved to its initial position, whereby the contact pin 12 moves radially in a direction from the current collector flange 9 and will come out of current transferring and braking engagement with the current collector and the armature 6, which thereby will begin to rotate with the hub, whereby the current generation ceases.

By means of this invention has thus been created a device, by means of which the operation can be brought about in a very simple and, at application as a bicycle generator, accident preventing manner, at the same time as the use of a connecting wire as a current transferring means, and the requirement of separate coupling and conductor members is eliminated.

The invention is not limited to the embodiment shown in the accompanying drawings and described in connection thereto but modifications are possible within the scope of the appended claims.

I claim:

1. A control device for a dynamo connected to a hub particularly a wheel hub and which dynamo is of the type incorporating stator and armature rotating with the hub and being arranged radially relative to each other and where the armature can be prevented from rotation by means of a locking device, and where a current collector is arranged to lead off current generated during arresting of the armature, characterized thereby, that the control device incorporates a connecting wire which is attached to said locking device, said locking device including a contact pin which is radially movable in a track located adjacent to the hub and which pin moves to current transmitting and rotation locking engagement with a current collector fixed to said armature, the connecting wire being made from an electrically conductive material and acting as a current conductor, which is fed with generated current via the current collector and the contact pin.

2. A control gear according to claim 1, characterized thereby,
that said contact pin (12) is biased by means of spring members (18) against a position releasing said current collector (8).

3. A control gear according to claim 1, characterized thereby,
that the current collector (8) is designed as an annular disc having a radially inwardly directed flange (9), which is arranged to be contacted and arrested by a groove formed in the contact pin (12).

4. A hub and dynamo arrangement comprising a wheel hub rotatable about the axis of a fixed shaft; a dynamo having an annular stator carried by the hub, an annular armature disposed radially inwardly of the stator and a current collector fixed to the armature for leading off current generated by the dynamo; means mounting the armature for rotation about the axis of said shaft independently of said hub; a control device for selectively arresting and permitting rotation of the armature about the axis of said shaft, whereby electric current is generated when the armature is arrested, said control device including a contact member mounted for radial movement relative to the axis of said shaft and mounted in a position such that said radial movement effects current-transmitting and rotation-locking engagement with said current collector; and an electrically-conducting actuating wire attached to said contact member for transmitting current from said contact member and for applying mechanical actuating force to said contact member.

5. In a wheel hub and dynamo arrangement wherein the dynamo is of the type having two dynamo members rotatable with the hub and disposed radially relative to each other, the arrangement being such that electric current is generated during rotation of one member relative to the other member: a current collector fixed to one of said members; a control device for selectively arresting and permitting rotation of said one member relative to said hub whereby electric current is generated when said one member is arrested, said control device including an electrically conductive contact element mounted for radial movement in a position such that said radial movement effects current-transmitting and rotation-arresting engagement with said current collector; and an electrically-conducting actuating wire attached to said contact element for transmitting current from said contact member and for applying mechanical actuating force to said contact member.

* * * * *